United States Patent [19]

Goel et al.

[11] Patent Number: 4,584,363

[45] Date of Patent: Apr. 22, 1986

[54] THERMOSET RESINS BASED ON BICYCLIC AMIDE ACETAL MODIFIED UNSATURATED POLYCARBOXYLIC ACIDS, POLYISOCYANATES AND VINYL MONOMERS

[75] Inventors: Anil Goel, Worthington; Timothy Tufts, Columbus, both of Ohio

[73] Assignee: Ashland Oil, Inc., Ashland, Ky.

[21] Appl. No.: 776,246

[22] Filed: Sep. 16, 1985

[51] Int. Cl.$^4$ .................... C08G 18/38; C08G 18/30; C08G 18/68
[52] U.S. Cl. .................................... 528/73; 521/137; 521/163; 528/75
[58] Field of Search .................... 528/73, 75; 521/163, 521/137

[56] References Cited

U.S. PATENT DOCUMENTS

| | | | |
|---|---|---|---|
| 3,647,759 | 3/1972 | Walker | 528/308.3 |
| 4,237,238 | 12/1980 | DeGuiseppi et al. | 521/173 |
| 4,246,364 | 1/1981 | Koehler et al. | 521/160 |
| 4,339,343 | 7/1982 | Koehler et al. | 521/118 |
| 4,444,916 | 4/1984 | Grube et al. | 521/131 |

*Primary Examiner*—Herbert S. Cockeram
*Attorney, Agent, or Firm*—John F. Jones

[57] ABSTRACT

A process for preparing novel thermoset resins by interpolymerizing a mixture of
(A) a polyol resulting from the reaction of an olefinically unsaturated polycarboxylic acid and a bicyclic amide acetal,
(B) a polyisocyanate, and
(C) a vinyl monomer component at a temperature in the range of from about room temperature to 200° C. and at a pressure in the range of from about atmospheric to 100 atmospheres is disclosed.

18 Claims, No Drawings

THERMOSET RESINS BASED ON BICYCLIC AMIDE ACETAL MODIFIED UNSATURATED POLYCARBOXYLIC ACIDS, POLYISOCYANATES AND VINYL MONOMERS

This invention relates to the manufacture of thermosetting resins by the interaction of (A) a polyol resulting from the reaction of an olefinically unsaturated polycarboxylic acid and a bicyclic amide acetal, (B) a polyisocyanate and (C) a vinyl monomer component and to the novel thermosetting resins themselves.

Unsaturated polyols which are unsaturated polyester polyols having tertiary amide groups in the backbone can be prepared by reaction of a bicyclic amide acetal with an unsaturated polycarboxylic acid in accordance with the disclosure in copending U.S. patent application, Ser. No. 682,444, filed 12/17/84. We have discovered that such polyols will undergo ready reaction with polyisocyanates and vinyl monomers to give novel thermoset polymers having useful physical properties.

Unsaturated polyester resins useful in thermoset polymer synthesis by copolymerization reactions with unsaturated monomers such as styrene have been known and are usually obtained by the condensation reactions of polyols with carboxylic anhydrides and dicarboxylic acids. Because of the presence of some unreacted carboxylic acid groups, such polyester resins could not be used in reactions with polyisocyanates to form polyurethanes. We have found that the conversion of carboxyl containing unsaturated polyesters to the corresponding polyols by reaction with bicyclic amide acetals as more completely disclosed in copending U.S. patent application Ser. No. 682,444, filed 12/17/84 enables one to use the polyesters in the synthesis of thermosetting polymers by interaction with polyisocyanates and vinyl monomers.

In accordance with this invention unsaturated polyester resins usually having acid values greater than 1 have been converted to the corresponding unsaturated polyester polyols by reacting them with bicyclic amide acetals, and such polyols have been used for the first time in thermoset polymer synthesis by reacting them with a vinyl monomer and a polyisocyanate. The resulting thermoset polymers have good physical properties and are useful in application such as molding, in coatings, and in structural adhesives.

Unsaturated polyesters which are useful in this invention are those prepared by the reaction of a polyol with an olefinically unsaturated polycarboxylic acid, usually maleic anhydride. The maleic anhydride reacts with the polyol to generate the unsaturated polyester having terminal carboxylic acid groups which can be further reacted with bicyclic amide acetals to convert the carboxylic acid end groups in the unsaturated polyester resins to hydroxyl end groups. The resulting low acid value unsaturated polyester polyols having tertiary amide groups in the polymer backbone have been found to be useful starting materials for the production of thermoset polymers by reacting them with polyisocyanates and unsaturated monomers, such as styrene. Catalysts such as free radical initiators for the vinyl polymerization and tertiary amines, organotin compounds, etc., for the polyol/polyisocyanate reaction may be used and their amounts generally control the polymerization rates. The ultimate physical properties of the thermoset resins of this invention depend largely upon the types and amounts of the polyester polyols and other types of polyols used, the type and amount of unsaturated monomers used and also on the type and amount of polyisocyanate used in the process. Addition of long chain polyol and lower amounts of unsaturated monomer (low cross-link density) usually results in flexible polymers which can be used as structural adhesives, whereas, short-chain polyols and large amounts of unsaturated monomers (high cross-link density) usually give tough and rigid polymers which are useful in RIM systems.

The polyesters useful in the preparation of polyester polyols more fully described in copending U.S. patent application Ser. No. 682,444 are those containing sufficient olefinic unsaturation so as to be thermosetting and this olefinic unsaturation is preferably supplied in the polyesters in the form of olefinically unsaturated dibasic acid moieties. The other portions of the polyester molecules may be composed of saturated dibasic acid, aliphatic polyhydric alcohol and aromatic polyhydric alcohol moieties. Illustrative olefinically unsaturated dibasic acids and anhydrides, saturated dibasic acids and anhydrides, aliphatic polyhydric alcohols and aromatic polyhydric alcohols useful in the preparation of polyols useful in this invention include maleic acid, chloromaleic acid, ethylmaleic acid, maleic anhydride, citraconic anhydride, mesaconic acid, fumaric acid, aconitic acid, itaconic acid, tetrahydrophthalic acid, adipic acid, azelaic acid, sebacic acid, dodecyl succinic acid, succinic acid, tetrachlorophthalic anhydride, phthalic anhydride, phthalic acid, isophthalic acid, hexahydrophthalic anhydride, malonic acid, citric acid, ethylene glycol, propylene glycol, trimethylene glycol, triethylene glycol, pentaethylene glycol, polyethylene glycol, 1,3-butanediol, diethylene glycol, dipropylene glycol, 2,2-dimethyl-1,3-propanediol, hexamethylene glycol, 1,4-cyclohexane dimethanol, xylene/alcohols, ethyl resorcinol, propyl resorcinol, 1,2,4-trimethyl resorcinol, 3,6-dimethyl-1,2,4-benzenetriol, ethyl pyrogallol, 2,4,-methyl-1,4-dihydroxy naphthalene, 2,3-methyl-1,4,5-naphthalene triol, dimethylol toluene, dimethylol xylene, bis-hydroxy ethyl or bis-hydroxy propyl ethers of resorcinol, catechol or hydroquinone, 1,5-dihydroxy naphthalene, 4,4'-isopropylidene-bis-phenol and the like.

Unsaturated monomers (vinyl monomers) which serve as cross-linking agents when copolymerized with the olefinic unsaturation in the polyesters which are useful in this invention are preferably liquid vinyl monomers which also can serve as solvents for the polyester and give pourable solutions when mixed with the polyester. Such vinyl monomers include styrene, substituted styrenes such as alpha-methyl styrene, vinyl toluenes, vinyl xylenes, nuclear halogenated styrenes such as o-chlorostyrene, p-chlorostyrene, m-chlorostyrene, mixtures thereof, the corresponding bromostyrenes, liquid acrylic esters, methacrylic esters and the like.

The bicyclic amide acetals useful in this invention are those having the structure I,

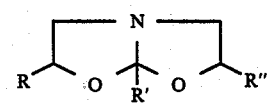

wherein R represents hydrogen or an alkyl group having from 1 to 18 carbon atoms, R' represents hydrogen or a hydrocarbon group having from 1 to 20 carbon atoms, and R" represents hydrogen, a hydrocarbon or ether group having from 1 to 18 carbon atoms.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1, 4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

It is within the scope of this invention to include some polyol other than the required polyester polyol in the polymerization mixture. The other polyols which can be used in chain extension of the polymers of this invention include those mentioned above in connection with the preparation of the unsaturated polyesters useful in this invention.

The process of this invention is conveniently carried out at a temperature in the range of from about room temperature to 200° C. and at a pressure in the range of from about atmospheric to 100 atmospheres.

The equivalent ratios of the isocyanate groups in the polyisocyanate to the combined hydroxyl groups of the unsaturated polyester polyol and the added chain extender polyol when the latter is used can be in the range of 0.8:1 to about 3:1 in the polymerization mixture in the process of this invention.

The weight ratio of the unsaturated polyester polyol to the unsaturated monomer can be in the range of from 100:0 to 20:80 and more preferably from 90:10 to 40:60 in the process of this invention. The amounts of chain extender polyols, with respect to the unsaturated polyester polyol, can be in the range of 0% to 80% by weight based on the unsaturated polyester.

The process and polymeric products of this invention are further illustrated in the following representative examples.

EXAMPLE 1

This example illustrates the preparation of an unsaturated polyester polyol for use in the process of this invention.

To a one liter, three-neck flask equipped with a mechanical stirrer, thermometer with a temperature controller and a nitrogen inlet, were added 615.4 g of poly(propylene oxide) diol (hydroxy equivalent weight 205), 294.2 g of maleic anhydride and 0.9 g of p-tolyl sulfonic acid (catalyst). The resulting mixture was heated at 80–120 degrees C. for eight hours to give the unsaturated diester dicarboxylic acid. To 292 g of this unsaturated diester dicarboxylic acid was slowly added 135.6 g of methyl substituted bicyclic amide acetal having the formula

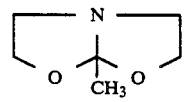

and the mixture was heated at 70–80 degrees C. for about three hours. The resulting viscous unsaturated polyester diol was found by analysis to have an acid value of 0.8 and a hydroxy number of 138.7.

EXAMPLE 2

The procedure of Example 1 was followed using 135.2 g of butane diol, 294 g of maleic anhydride and 2 g of p-tolyl sulfonic acid in the preparation of the unsaturated diester dicarboxylic acid. A 249 g portion of the unsaturated diester dicarboxylic acid was then allowed to react with 24.2 g of the bicyclic amide acetal to give the unsaturated polyester diol having a hydroxy number of 203.

EXAMPLE 3

The procedure of Example 1 was followed using 500 g of poly(tetramethylene ether) diol (equivalent weight of 500), 98 g of maleic anhydride and 1 g of p-tolyl sulfonic acid. The resulting diester dicarboxylic acid was allowed to react with 130 g of the bicyclic amide acetal to give the unsaturated polyester diol having a hydroxy number of 69.8 and an acid value of 0.6.

EXAMPLE 4

A mixture of 40.5 g of the polyol of Example 1, 20 g of tripropylene glycol, 15 g of styrene, 0.6 g of t-butyl peroctoate (free radical initiator) and 0.3 g of N,N',N"-tris(dimethylamino propyl) hexahydrotriazine (polyurethane catalyst) was degassed on a rotary evaporator and mixed with 48 g of degassed liquid methylene bis(phenyl isocyanate). The resulting mixture was poured into a mold prepared from two parallel glass plates which were coated with silicone mold release agent and were held apart by ⅛ inch spacers. The mold was then heated at 100 degrees C. for one hour followed by a post curing at 130 degrees C. for one hour. The resulting solid polymer was found to have a notched izod impact strength (ASTM D-256) of 0.8 foot pounds/inch of notch and a heat distortion temperature (ASTM D-648) of 88 degrees C.

EXAMPLE 5

The procedure of Example 4 was followed using 55.3 g of the diol of Example 2, 20 g of tripropylene glycol, 16 g of styrene, 0.7 g of t-butyl peroctoate, 0.2 g of the tertiary amine catalyst of Example 4 and 65 g of the diisocyanate of Example 4. The resulting polymer sheet was found to have a notched izod impact strength of 0.6 foot pounds/inch of notch and a heat distortion temperature of 94 degrees C.

EXAMPLE 6

The procedure of Example 4 was followed using 72 g of the unsaturated diol of Example 3, 5 g of the bicyclic amide acetal, 10 g of styrene, 0.2 g of t-butyl peroctoate and 30 g of the liquid diisocyanate. The resulting polymer sheet was found to have a notched izod impact strength of 1.7 foot pounds/inch of notch, an unnotched izod impact strength of greater than 14.4 foot pounds/inch and a heat distortion temperature of 37.4 degrees C.

EXAMPLE 7

The procedure of Example 4 was followed using 70 g of the unsaturated diol of Example 3, 10 g of tripropylene glycol, 19 g of styrene, 0.6 g of t-butyl peroctoate, 0.2 g of tertiary amine catalyst and 32 g of liquid diisocyanate. The resulting polymer sheet was found to have a notched izod impact strength of 0.9 foot pounds/inch of notch and a heat distortion temperature of 76 degrees C.

EXAMPLE 8

A commercial sample of an unsaturated polyester-monomer mixture (Aropol 7221, Ashland Chemical Company prepared from the reaction of maleic anhydride/phthalic anhydride/propylene glycol) having about 35% by weight of styrene, an acid value of 10.66, a hydroxy number of 22 and a viscosity of 1852 cps (70g) was mixed with 17.4 g of the bicyclic amide acetal described in Example 1 and the resulting mixture was heated at 60 degrees C. for six hours giving a product having an acid value of less than 0.4. A portion of this modified resin (60 g) was mixed with 40 g of dipropylene glycol, 3.0 g of t-butyl perbenzoate, and 1 g of SA-102 (blocked DBU catalyst, from Abbott Chem.). The mixture was degassed on a rotary evaporator and mixed by hand with 100g of degassed polymeric MDI (Mondur MR with NCO functionality of about 2.5) for 15 seconds and poured into a mold and maintained at 60 degrees C. Gelation occurred within 60 seconds and the panel was postcured for one hour at 130 degrees C. The resulting sheet was found to have a notched izod impact strength of 0.45 foot pounds/inch of notch and a heat distortion temperature of 124 degrees C.

EXAMPLE 9

A commercially available unsaturated polyester (Aropol Q-6585 from Ashland Chemical Company prepared from the reaction of maleic anhydride/propylene glycol) was treated with the appropriate amount of bicyclic amide acetal in a similar manner as that described in Example 8. Analysis of the resulting material before and after the bicyclic amide acetal treatment revealed that before treatment the unsaturated polyester contained 34% by weight of styrene, 0.07% by weight of water and had an acid value of 20.3, a hydroxy number of 34 and a viscosity of 980 cps and the bicyclic amide acetal treated unsaturated polyester was found to have 33% by weight of styrene, 0.02% by weight of water, an acid value of 0.3, a hydroxy number of 72 and a viscosity of 950 cps. A 50 g portion of the bicyclic amide acetal treated unsaturated polyester was mixed with 25 g of dipropylene glycol and 25 g of diethylene glycol to obtain a clear, homogeneous solution. The solution was mixed with 3.90 g of t-butyl perbenzoate and 1.0 g of the tertiary amine catalyst of Example 4. The degassed solution was mixed with 133 g of the degassed polyisocyanate of Example 8. The heat distortion temperature of the resulting polymer was found to be 100 degrees C. and it had a notched izod impact strength of 0.55 foot pounds/inch of notch.

EXAMPLE 10

The modified Aropol Q-6585 of Example 9 (60 g) was mixed with 40 g of dipropylene glycol, 1.0 g of SA-102 hindered amine partially blocked by ethyl hexanoic acid, catalyst and 3.0 g of t-butyl perbenzoate and the mixture was polymerized with 99 g of the polyisocyanate described in Example 8 by following the procedure of Example 8. The resulting polymer was found to have a notched izod impact strength of 0.4 foot pounds/inch of notch and a heat distortion temperature of 113 degrees C.

EXAMPLE 11

The unsaturated polyester diol of Example 1 (4.05 g), 14.85 g of ethylene oxide capped poly(propylene oxide) triol (hydroxy equivalent weight of 371) and 0.01 g of tin dioctoate were mixed. A 5.0 g portion of this mixture was mixed with 4.36 g of a methylene bis (phenyl isocyanate) based polyisocyanate prepolymer prepared by treating poly(propylene oxide) polyol with liquid MDI (isocyanate equivalent weight of 290 ). This mixture was applied between two 1" (width) by 4" (length) fiber glass reinforced sheet molding compound sheets covering a one square inch area of overlap. The bond thickness was controlled at 30 mils by placing 30 mil diameter glass beads in the adhesive. The adhesive bond was allowed to cure at room temperature for two hours and was then postcured at 121 degrees C. for 30 minutes. The resulting sample was then tested in a lap shear strength test and substrate failure was found to occur at 385 psi.

EXAMPLE 12

The procedure of Example 11 was followed using a mixture of the unsaturated polyester diol (2.76 g) of Example 2 with 14.85 g of ethylene oxide capped poly(-propylene oxide) triol (hydroxy equivalent weight of 371) and 0.01 g of tin dioctoate and curing the mixture with 16.5 g of the polyisocyanate prepolymer. The cured structure upon testing for lap shear resulted in substrate failure at 565 psi.

EXAMPLE 13

The procedure of Example 11 was followed using 5.74 g of the polyol of Example 3, 11.88 g of ethylene oxide capped poly(propylene oxide) triol, 0.01 g of tin dioctoate and curing the mixture with 13.2 g of the polyisocyanate prepolymer. The cured bond, upon testing, resulted in substrate failure at 490 psi.

We claim:
1. The process for preparing a thermoset resin comprising interpolymerizing a mixture of
   (A) a polyol resulting from the reaction of an olefinically unsaturated polycarboxylic acid and a bicyclic amide acetal,
   (B) a polyisocyanate, and
   (C) a vinyl monomer component at a temperature in the range of from about room temperature to 200° C. and at a pressure in the range of from about atmospheric to 100 atmospheres.
2. The process of claim 1 wherein the bicyclic amide acetal is one having the structure

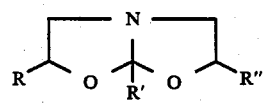

wherein R represents hydrogen or an alkyl group having from 1 to 18 carbon atoms, R' represents hydrogen or a hydrocarbon group having from 1 to 20 carbon atoms, and R" represents hydrogen, a hydrocarbon or ether group having from 1 to 18 carbon atoms.

3. The process of claim 2 wherein the olefinically unsaturated polycarboxylic acid is one having at least two carboxylic acid groups per molecule.

4. The process of claim 3 wherein the polyisocyanate is one having at least two isocyanate groups per molecule.

5. The process of claim 4 wherein the vinyl monomer is a liquid styrene, substituted styrene, acrylic ester, methacrylic ester or mixtures thereof.

6. The process of claim 5 wherein the polyol is the reaction product of poly(propylene oxide) diol, maleic anhydride and a bicyclic amide acetal is one in which R and R" are hydrogen and R' is methyl.

7. The process of claim 5 wherein the polyol is one resulting from the reaction of butane diol, maleic anhydride and a bicyclic amide acetal in which R and R" are hydrogen and R' is methyl.

8. The process of claim 5 wherein the polyol is one resulting from the reaction of poly(tetramethylene ether) diol, maleic anhydride and a bicyclic amide acetal in which R and R" are hydrogen and R' is methyl.

9. The process of claim 6 wherein the vinyl monomer is styrene and the polyisocyanate is methylene bis(phenyl isocyanate).

10. The process of claim 7 wherein the vinyl monomer is styrene and the polyisocyanate is methylene bis(phenyl isocyanate).

11. The process of claim 8 wherein the vinyl monomer is styrene and the polyisocyanate is methylene bis(phenyl isocyanate).

12. The process of claim 5 wherein the polyol is the reaction product of propylene glycol, maleic anhydride and a bicyclic amide acetal in which R and R" are hydrogen and R' is methyl, the vinyl monomer is styrene and the polyisocyanate is methylene bis(phenyl isocyanate).

13. The process of claim 6 wherein the polyisocyanate is a polyisocyanate prepolymer prepared by reaction of poly(propylene oxide) polyol with methylene bis(phenyl isocyanate).

14. The thermoset resin produced by the process of claim 1.

15. The thermoset resin produced by the process of claim 2.

16. The thermoset resin produced by the process of claim 3.

17. The thermoset resin produced by the process of claim 4.

18. The thermoset resin produced by the process of claim 5.

* * * * *